United States Patent [19]
Leamy et al.

[11] Patent Number: 5,590,245
[45] Date of Patent: Dec. 31, 1996

[54] METHOD FOR TRANSMITTING IMAGE PROCESSING JOBS FROM A CLIENT SYSTEM, AND ROUTING AND PERFORMING THE JOBS IN AN IMAGE PROCESSING SYSTEM

[75] Inventors: Patrick Leamy; Alan Leamy; John Gillin, all of Dublin, Ireland

[73] Assignee: Offset Studios Limited, Dublin, Ireland

[21] Appl. No.: 294,030

[22] Filed: Aug. 24, 1994

[30]     Foreign Application Priority Data

Apr. 6, 1994 [IE] Ireland ..................................... 940297

[51] Int. Cl.⁶ .................................................. G06F 13/00
[52] U.S. Cl. ........................... 395/118; 395/114; 395/761; 395/109; 395/200.02
[58] Field of Search ............................... 395/200.02, 114, 395/100, 144, 109

[56]     References Cited

U.S. PATENT DOCUMENTS

| | | | |
|---|---|---|---|
| 4,970,554 | 11/1990 | Rourke | 355/102 |
| 5,081,699 | 1/1992 | Filion et al. | 395/145 |
| 5,128,878 | 7/1992 | Gore et al. | 395/162 |
| 5,163,122 | 11/1992 | Urabe et al. | 395/109 |
| 5,168,371 | 12/1992 | Takayanagi | 358/296 |
| 5,179,637 | 1/1993 | Nardozzi | 395/114 |
| 5,226,112 | 7/1993 | Mensing et al. | 395/114 |
| 5,243,381 | 9/1993 | Hube | 355/204 |
| 5,309,555 | 5/1994 | Akins et al. | 395/157 |
| 5,402,527 | 3/1995 | Bigby et al. | 395/101 |
| 5,436,730 | 7/1995 | Hube | 358/401 |
| 5,457,434 | 11/1995 | Hower, Jr. et al. | 395/114 |
| 5,469,534 | 11/1995 | Brindle et al. | 395/114 |
| 5,483,653 | 1/1996 | Furman | 395/650 |
| 5,517,316 | 5/1996 | Hube | 358/296 |

*Primary Examiner*—Christopher B. Shin
*Attorney, Agent, or Firm*—Jacobson, Price, Holman & Stern, PLLC

[57]     ABSTRACT

An image processing method is carried out by a system (1) where a client system (2) automatically logs client data and retrieves image data to produce a job file which is automatically transmitted to a modem (10) of an image processing system (3). A control image processor (11) automatically monitors the job file and carries out routing operations and also supervisor notification operations to ensure efficient and effective implementation of the image processing method as required by the client. Each of the workstations (18, 19, 20) is capable of automatic configuration for particular job types by setting of image processing parameter values such as memory and virtual memory settings.

10 Claims, 2 Drawing Sheets

METHOD FOR TRANSMITTING IMAGE PROCESSING JOBS FROM A CLIENT SYSTEM, AND ROUTING AND PERFORMING THE JOBS IN AN IMAGE PROCESSING SYSTEM

BACKGROUND OF THE INVENTION

1. Field of the Invention

The invention relates to an image processing method carried out by an image processing system which receives image data. The image processing carried out may involve direct output to a scanner/printer, image make-up, image re-touching, or imposition.

2. Prior Art Discussion

In recent years, image processing equipment has become more sophisticated and powerful with major improvements being made in both hardware and software. For example, a communications system and a workstation for image processing are described in PCT Patent Specification Nos. WO 87/05767 and WO 87/05768 (Eastman Kodak Company), respectively. In the latter specification the workstation which is described has a data processing section and an image section. A communication module handles all communications with other nodes in a network. Both specifications therefore describe a distributed image processing arrangement for more efficient image processing by, for example, an arrangement where the CPU of a workstation is not required to process each pixel or group of pixels. Further, European Patent Specification No. EP-A-0564201 (Canon) describes an image processing apparatus in which a scanner/printer is utilized efficiently. In this system, image data which is received is subject to character recognition, coding and translation. In addition, image data is generated by a page-description-language interpreter. PCT Patent Specification No. WO 91/10316 (Eastman Kodak) describes a system whereby intermediary metric images are outputted and these may be stored for later use. At a later stage, composite images may be generated.

In summary, therefore, much development work has been carried out in developing hardware and software in systems for carrying out image processing.

SUMMARY OF THE INVENTION

An object is to provide an image processing method which utilized available hardware and software in a manner to provide for efficient image processing in an environment where clients provide various instructions and image data, and in which instructions must be carried out very quickly and at a high quality to provide the printed film outputs required by the clients. Further, the invention is directed towards providing an image processing method where there are varied client requirements and a large degree of versatility is required in the image processing method to efficiently carry out the necessary image processing.

An image processing method is carried out by a client system comprising an image processor having a communications device and by an image processing system comprising a network connected to a plurality of image processing workstations, to scanner/printer devices, to printers, and to a control image processor which is in turn connected to a communications device. The method comprises the steps of:

- the image processor of the client system interactively logging client data instructing the carrying out of the image processing operations;
- the image processor of the client system automatically retrieving image data from storage devices to which it is connected;
- the image processor of the client system combining the logged client data and the retrieved image data and compressing said data to generate a transmission file;
- the communications device of the client system automatically transmitting the file to the communications device connected to the control image processor of the image processing system;
- the control image processor automatically decompressing the received data file and reading a client identifier and generating an output notification display on a video screen of the control image processor;
- the control image processor generating a parameter display for interactive inputting of job parameters by a supervisor according to the received data;
- the control image processor generating a job file according to inputted parameters and data received from the client system, automatically routing the job file to a workstation of the image processing system;
- the workstation which receives the job file automatically determining if the job is for direct output to a printer and if so automatically routing the data to a printer of the network, and if the job is not for a direct output, the workstation reading data within the job file and automatically configuring image processing settings via the operating system for carrying out the image processing operations required; and
- the workstation carrying out the image processing operations and, when completed, automatically transmitting a supervisor signal to the control image processor and subsequently routing the processed image data to a printer for printing of color separation films.

In one embodiment, the step of logging client data comprises the sub-steps of displaying prompts for inputting data, displaying pre-set responses and automatically verifying inputted data by reference to the pre-set responses, said responses being recognizable by the control image processor of the image processing system.

In another embodiment, the step of retrieving image data comprises the sub-steps of retrieving addresses which are recorded in real-time during generation of the image data.

Preferably, the control image processor monitors a time data element recorded together with the image data which is retrieved, and verifies that the image data is current.

In a further embodiment, the step of retrieving image data comprises the sub-steps of verifying the color integrity of the retrieved image data by monitoring reference values.

Ideally, the workstation automatically sets parameter values by use of operating system commands.

BRIEF DESCRIPTION OF THE DRAWINGS

The invention will be more clearly understood from the following description of some embodiments thereof, given by way of example only with reference to the accompanying drawings in which.

DESCRIPTION OF THE PREFERRED EMBODIMENTS

Figure 1:
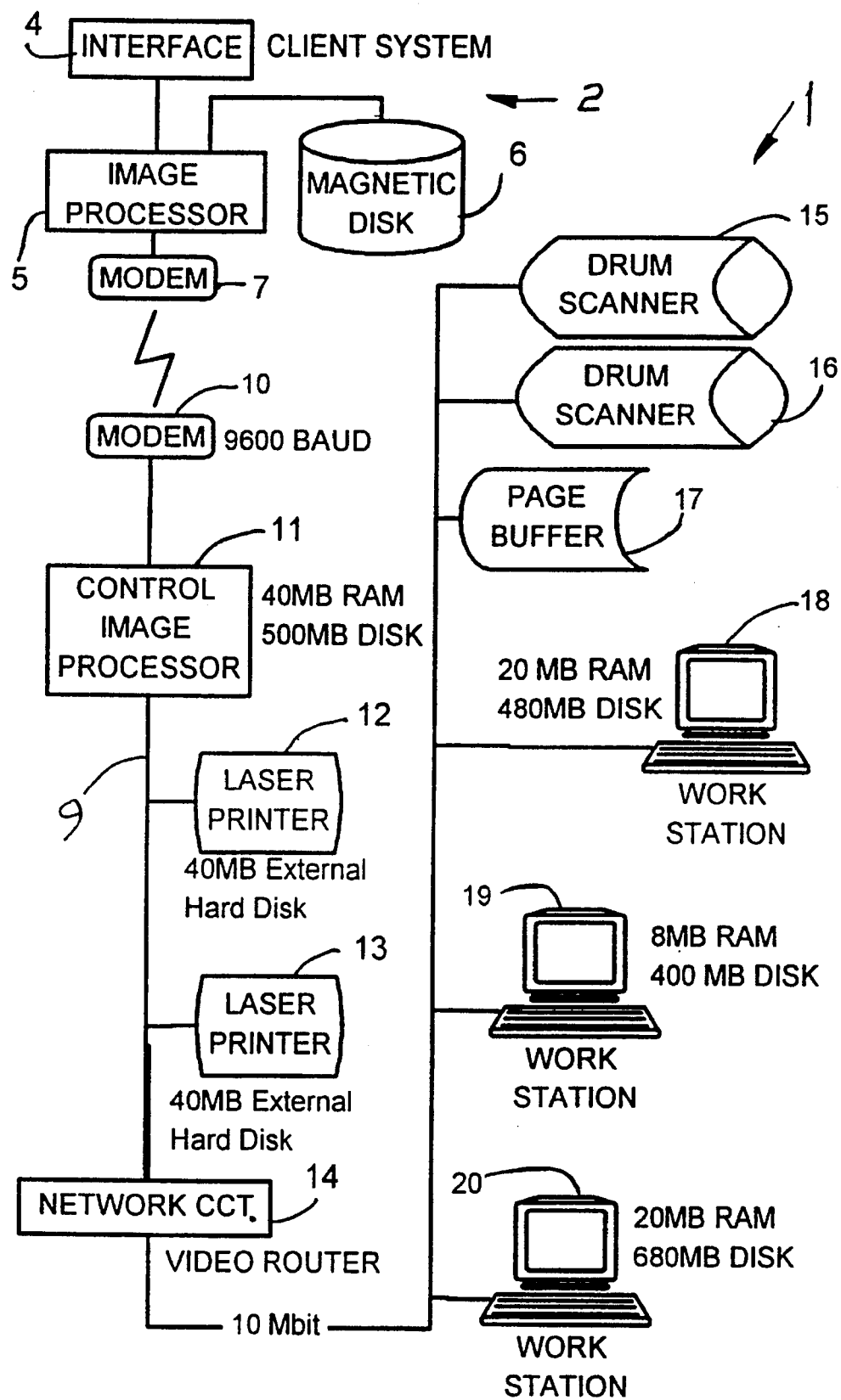
FIG. 1 is a schematic diagram showing an image processing system for carrying out a method of the invention.

Referring to the drawings, and initially to FIG. 1 there is illustrated an image processing system which is utilized to perform an image processing method of the invention. The method of the invention is achieved by the manner in which the various image processing devices are interconnected and by the manner in which they are operated to provide an overall method which efficiently and effectively carries out image processing in response to client instructions. The image processing may be broken down into four general groups as follows:

A. direct printer output,

B. make-up,

C. re-touching, and

D. imposition.

The requirements of the system 1 are that instructions and artwork or image data generally is received from a client's system and one or more of the above operations are carried out to provide a printed film output which clients can supply to their printers.

The overall system is indicated generally by the reference numeral 1 and within the system there is a client system 2 communicating with an image processing system 3.

The client system 2 comprises an interface 4, an image processor 5, a magnetic disk 6 and a modem 7. The image processor 5 is programmed to carry out various image processing operations in conjunction with the image processing system 3, as described below.

The system 3 comprises a 9600 baud modem 10 which is connected to a control image processor 11. The control image processor 11 comprises a 40 MB RAM and a 500 MB disk. The system 3 also comprises a 10 Mbit network 9 which connects the control image processor 11 to various other image processing devices. These devices include a laser printer 12 which has a 40 MB external hard disk. There is also a second laser printer 13 having a 40 MB external hard disk and the network 9 also includes a network control circuit 14 with a video card. There are two drum scanners 15 and 16 and a page buffer 17 connected to the network cable 9. The system 3 also comprises three workstations 18, 19 and 20 for which the memory and disk capacities are indicated in the drawings.

Figure 2:
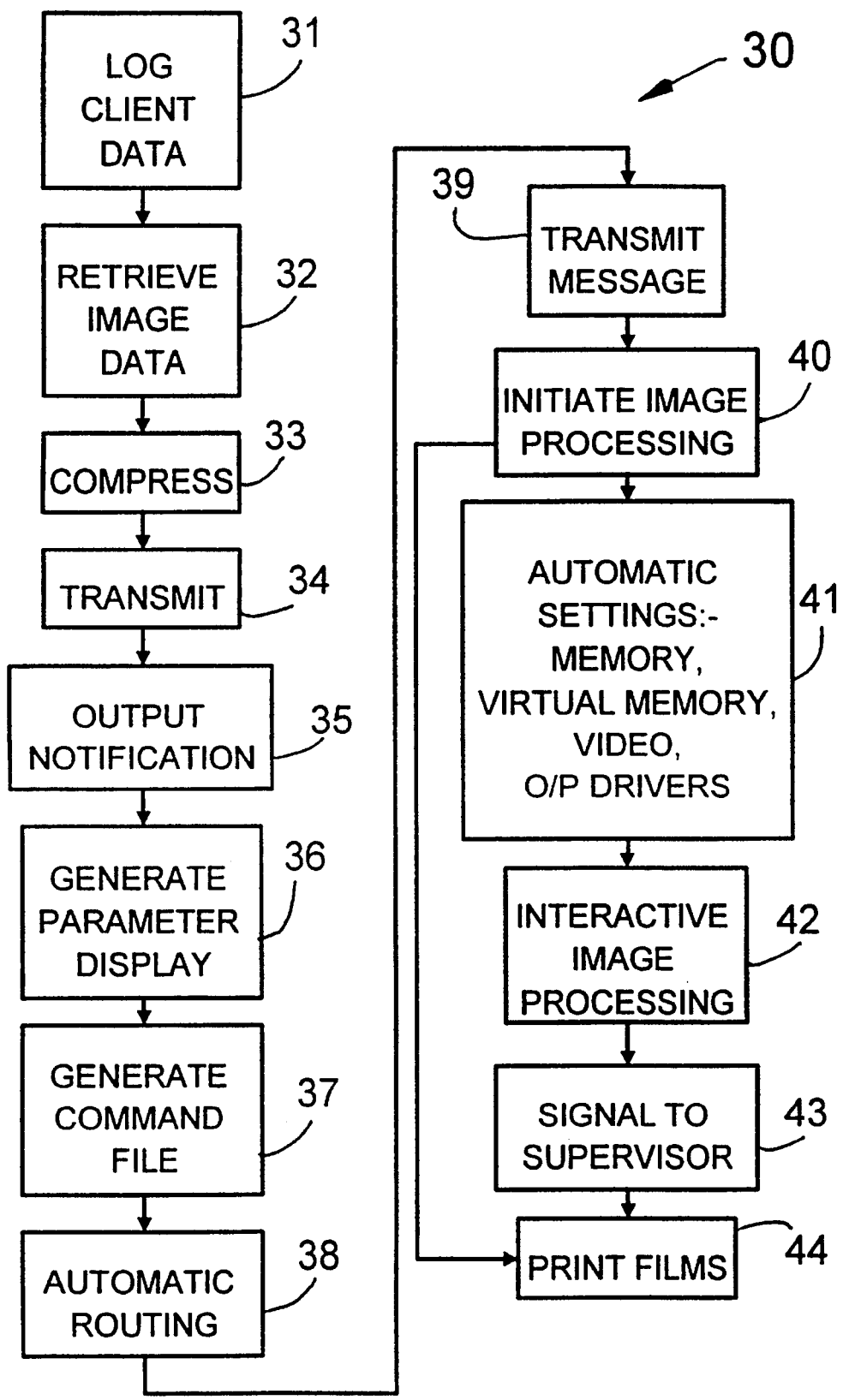
FIG. 2 is a flow chart illustrating the image processing method of the invention.

Referring now to FIG. 2, the particular manner in which the client system 2 and the image processing system 3 are constructed to carry out the image processing method of the invention is now described. The method is indicated generally by the numeral 30 and begins with step 31 which involves the image processor 5 logging client instruction data for carrying out the image processing method 30. Data is logged by the processor 5 automatically generating a data input screen which is displayed together with pre-set responses which must be inputted by the user. These inputs correspond directly with pre-set codes which are understood by the control image processor 11. There is additionally a field for inputting special instructions in textual format.

In step 32, the image processor 5 automatically reads the pathnames associated with image data, the pathnames being retrieved according to the data and instructions which are inputted in step 31. This involves automatically cross-referencing pre-set pathnames which are updated on an ongoing basis in real-time as new image data is generated by the image processor 5. In addition, the real-time pathname updating involves logging of a time stamp and this is verified by the image processor 5 in step 32. In addition, step 32 involves an automatic verification of color by comparison of retrieved image data with reference image data which is related to it by pathname. Where differences are detected, the image processor 5 prompts the user to edit the various items of artwork on the processor 5 or to provide an over-ride input.

In step 33 of the method, the image processor 5 carries out run time encoding compression of all of the retrieved image data to produce a compressed binary data file which is transmitted in step 34 via the modem 7 to the modem 10 of the image processing system 3. In this compressed binary bit file, there is both image data and also instructions and text to define instructions for an image processing method to be carried out by the system 3. In summary, therefore, there is a file of image data, together with processing instructions including such parameter values as film specification, typefaces, dependent artwork, and turn-around time for production of the color separation printing films.

The remaining steps 35 to 44 of the method 30 are carried out by the image processing system 3.

When the instruction and image data file is received by the control image processor 11, the data is decompressed and the client identifier within the instructions is read. The control processor 11 automatically transmits a notification signal to the user by generating an appropriate screen display in step 35. In step 36, the control image processor 11 automatically generates a parameter display screen in which the client information is displayed and the supervisor must input various production commands for carrying out the image processing method. One such input is a job category command whereby the job is classified as either a direct output, a page make-up, a re-touching job or an imposition job. The control image processor 11 automatically generates a command file in step 37 and also determines a suitable workstation for carrying out the job and so automatically routes the job file in step 38 to the relevant workstation. In addition, a messaging protocol is used in step 39 for transmitting a message which creates a screen interrupt for the user of the relevant workstation.

Image processing of the job is initiated in step 40 and in the event that the job is category A above, it is routed directly through one of the scanners 15 or 16 for printing of the films. The scanners 15 and 16 are capable of both scanning images and also producing printed films.

An important aspect of the invention is the fact that if the workstation is to carry out image processing before routing to the scanner for printing of films, automatic machine configuration-is carried out. This involves the operating system of the workstation 18, 19 or 20 changing settings according to the job file for video displays, memory, virtual memory, network communications and also for output drivers. In more detail, these automatic steps are carried out by the relevant workstation 18, 19 or 20 automatically retrieving a look-up table from the control image processor, which table contains pre-defined machine settings. According to the job file, the relevant workstation selects a group of settings from the table. A data report is generated for approval and input of fresh settings by the supervisor at the processor 11 if the selected variables do not fall within reference ranges for the particular workstation 18, 19 or 20. Inputs may also be made at the relevant workstation 18, 19 or 20. The end result of step 41 is therefore that the workstation 18, 19 or 20 which is to carry out the image processing has stored settings for configuration is an optimum manner for the required operations. Further, this is achieved with very little operator input.

Interactive image processing 42 is then carried out and this may involve page make-up, re-touching, or imposition. In more detail, the relevant workstation 18, 19 or 20 configures itself as follows for the particular image process. Using the settings generated in step 41 for page make-up, the configuration process is:

1. Check required memory capacity.
2. Excess data from previous process is retrieved.
3. Any additional data and commands are retrieved from the control processor 11.
4. Apply settings determined in step 41:
   maximise RAM for page-layout operations;
   typefaces setting;
   set monitor bit-depth to 24 bit;
   switch on system virtual memory;
   load ancillary utility programs;
   set output device calibration profile;
   log start time.
5. Carry out page make-up image processing with operator inputs.
6. Transmit film specification settings to output device.
7. Transmit process complete indicator to control processor 11.

For imposition, the configuration process is:

1. Check required memory capacity.
2. Excess data from previous process is retrieved.
3. Retrieve additional data and commands from control processor 11.
4. Apply settings determined in step 41:
   maximise RAM for imposition program;
   set monitor bit-depth to 8-bit;
   switch on system virtual memory;
   set calibration profile to output device;
   log start time.
5. Carry out imposition image processing.
6. Transmit film specification settings to output device or route to batch processor controlling output device.
7. Transmit process complete indicator to control processor 11.

As indicated in the flow chart of FIG. 2, in step 42, the relevant image processor automatically transmits a signal to the control image processor 11 directing display of a signal to the supervisor that image processing is complete and that the job file is being transmitted to the relevant scanner for printing of the films in step 44.

Other functions of the control image processor 11 which are not illustrated in the flow chart 30 are the periodic automatic initiation of calibration operations at each of the image processing workstations of the system 3. At set intervals a calibration program stored on the disk of each processor 18, 19 and 20 automatically generates a display to indicate that the associated video screen should be calibrated. When the command is inputted by the operator, a sub-program is activated to control recording of actual color values using a sensor. These values are compared with either workstation or system reference values. This process also applies to any other output device including the film printers.

Finally, the control image processor transmits relevant instructions to workstations on the network for display of signals reminding operators of the need to carry out certain maintenance work on the disks and other parts of the system such as the scanners.

It will be appreciated that the method of the invention provides for the efficient and effective routing of jobs because many of the steps are carried out automatically by the system 3 and because there is a relatively small but significant interactive input from supervisors and operators for maximum efficiency and versatility.

The invention is not limited to the embodiments hereinbefore described, but may be varied in construction and detail.

We claim:

1. An image processing method carried out by a client system comprising an image processor having a communications device and by an image processing system comprising a network connected to a plurality of image processing workstations, to scanner/printer devices, to printers, and to a control image processor which is in turn connected to a communications device, the method comprising the steps of:

the image processor of the client system generating a transmission file by:
     interactively logging client data for instructing image processing operations,
   automatically retrieving image data from storage devices to which the image processor is connected using said client data, and
     combining the logged client data and the retrieved image data and compressing said logged client data and said retrieved image data to generate the transmission file, the communications device of the client system automatically transmitting said transmission file to the communications device connected to the control image processor of the image processing system;

the control image processor: automatically decompressing the transmission file received via the communications device, reading a client identifier from the client data and generating an output notification display on a video screen of the control image processor,
     generating a parameter display for interactive inputting of job parameters by a supervisor according to data received in said transmission file, the parameters including a job category command classifying the job as direct output, page make-up, re-touching, or imposition, and
     generating a job file of image processing commands according to inputted parameters and the client data, and automatically routing the job file to a workstation of the image processing system;

the workstation which receives the job file automatically determining if the job is for direct output to a printer according to the job category command and if so automatically routing the image processing commands to a printer of the network, and if the job is not for direct output the workstation reading the image processing commands within the job file and automatically configuring image processing settings via the workstation operating system for carrying out image processing operations required by said image processing commands, the settings being selected from a look-up table retrieved from the control image processor; and the workstation carrying out the image processing operations and generating processed image data and, when completed, automatically transmitting a supervisor signal to the control image processor and subsequently routing the processed image data to a printer for printing of color separation films.

2. The method as claimed in claim 1, wherein the step of the client system logging client data comprises the sub-steps of displaying prompts for inputting data, displaying pre-set responses and automatically verifying inputted data by reference to the pre-set responses, said responses being recognizable by the control image processor of the image processing system.

3. The method as claimed in claim 1, wherein the step of the client system retrieving image data comprises the sub-steps of retrieving addresses which are recorded in real-time during generation of the image data.

4. The method as claimed in claim 3, wherein the client system image processor monitors a time data element recorded together with the image data which is retrieved, and verifies that the image data is current.

5. The method as claimed in claim 1, wherein the step of the client system retrieving image data comprises the substeps of verifying color integrity of the retrieved image data by monitoring reference values.

6. The method as claimed in claim 1, wherein the control image processor performs the further step of transmitting a message with the job file to the workstation, said message creating a screen interrupt at the receiving workstation.

7. The method as claimed in claim 1, wherein the workstation receiving the job file generates a data report of the selected configuration settings and prompts input of revised settings if the selected settings do not fall within reference ranges for the workstation.

8. The method as claimed in claim 1, wherein the configuration settings are of the type for maximizing RAM for page layout, for setting a monitor bit-depth for switching on virtual memory, and for logging a start timer.

9. The method as claimed in claim 1, wherein at set intervals the control image processor causes output of a display indicating that calibration of each workstation monitor should be carried out.

10. A method as claimed in claim 9, wherein each workstation records actual sensed color values and compares the color values with reference values for calibration.

* * * * *